United States Patent [19]
Tung

[11] Patent Number: 5,455,092
[45] Date of Patent: Oct. 3, 1995

[54] LABELSTOCK FOR SQUEEZABLE PRESSURE-SENSITIVE LABELS

[75] Inventor: Harvey C. Tung, Newark, Ohio

[73] Assignee: The Dow Chemical Company, Midland, Mich.

[21] Appl. No.: 60,768

[22] Filed: May 11, 1993

Related U.S. Application Data

[63] Continuation of Ser. No. 790,899, Nov. 12, 1991, abandoned.

[51] Int. Cl.$^6$ .............. B32B 27/32; C08L 23/06; C08L 23/12
[52] U.S. Cl. .............. 428/40; 40/310; 283/81; 524/108; 524/109; 524/141; 524/143; 524/394; 524/400; 525/240; 428/213; 428/215; 428/323; 428/343; 428/354; 428/515; 428/516; 428/914
[58] Field of Search .................... 428/40, 36.2, 516, 428/354, 220, 213, 215, 323, 343, 409, 500, 515, 914; 524/108, 141, 143, 109, 394, 400; 525/240; 40/310; 283/81

[56] References Cited

U.S. PATENT DOCUMENTS

| | | | |
|---|---|---|---|
| 4,016,118 | 4/1977 | Hamada et al. | 260/17.4 |
| 4,483,952 | 11/1984 | Uchiyama | 524/108 |
| 4,587,158 | 5/1986 | Ewing | 428/219 |
| 4,713,273 | 12/1987 | Freedman | 428/40 |
| 4,720,416 | 1/1988 | Duncan | 428/195 |
| 4,801,637 | 1/1989 | McCullough | 524/287 |
| 5,043,204 | 8/1991 | Itaba | 428/213 |
| 5,049,605 | 9/1991 | Rekers | 524/108 |

FOREIGN PATENT DOCUMENTS 5847043 3/1983 Japan.

OTHER PUBLICATIONS

Monks, "Nucleants Make Clearer Case for Polypropylene," *Plastics Technology*, Nov. 1989, pp. 65–67.

*Primary Examiner*—Nasser Ahmad

[57] ABSTRACT

A labelstock which comprises a release-coated liner, a facestock including a layer consisting essentially of one or more nucleating agents of polyolefins and (a) one or more olefin homopolymers or (b) one or more copolymers of olefins or (c) a mixture of (a) and (b), and a pressure-sensitive adhesive for releasably joining the facestock to the release-coated liner.

17 Claims, No Drawings

LABELSTOCK FOR SQUEEZABLE PRESSURE-SENSITIVE LABELS

CROSS-REFERENCE TO RELATED APPLICATION

This is a continuation of application Ser. No. 07/790,899, filed Nov. 12, 1991 now abandoned.

BACKGROUND OF THE INVENTION

The present invention relates to labelstocks and to the labels made therefrom. More specifically, the invention relates to pressure-sensitive labelstocks and labels for deformable or squeezable containers, squeezable containers being understood in the art as describing those containers which are squeezed to dispense their contents. In particular the present invention is concerned with label facestocks for squeezable containers which have a degree of contact clarity.

Facestocks for the pressure-sensitive labeling of squeezable containers generally must possess a number of attributes to be suitable. These facestocks must be sufficiently stiff to be dispensable in automatic labeling equipment, while at the same time being sufficiently flexible and "squeezable" to conform to the container and to stay conformed to the container without lifting, wrinkling or tearing as the container is flexed or squeezed in use. Suitable facestocks also are die-cuttable and matrix-strippable, dimensionally stable, and printable. Of late, contact clarity has particularly been a desired attribute. Finally, it is particularly desirable if all of these various attributes may be found in a relatively inexpensive material.

At present, frosty clear vinyl labels and low density and medium density polyethylene labels, such as described in U.S. Pat. No. Re. 32,929 to Ewing, are used for the unpigmented pressure-sensitive labeling of squeezable containers. Each of these materials possesses at least one drawback, however, as regards the attributes described in the preceding paragraph.

Frosty clear vinyl labels are comparatively expensive and are not dimensionally stable as applied to a container. Low density polyethylene facestocks do not die-cut or dispense well and tend to have a bluish cast when applied to dark-colored bottles or containers, but are inexpensive, conformable, squeezable and dimensionally stable. Medium density facestocks are stiffer and more die-cuttable than the low density facestocks (although they are not as stiff or die-cuttable as generally desired), but possess an unacceptable degree of haze along with the bluish cast seen with low density polyethylene. In short, there is room for significant improvements in the clear pressure-sensitive labeling of squeezable containers.

SUMMARY OF THE PRESENT INVENTION

To meet this need, the present invention provides a pressure-sensitive labelstock which is particularly adapted to the clear pressure-sensitive labeling of squeezable containers. The labelstock of the present invention comprises a release-coated liner material, a facestock which includes a layer consisting essentially of one or more nucleating agents of polyolefins and (a) one or more olefin homopolymers or (b) one or more copolymers of olefins or (c) a mixture of (a) and (b), and a pressure-sensitive adhesive for releasably joining the facestock to the release-coated liner. In one embodiment, the facestock consists of a single such layer. In other embodiments, the facestock includes additional layers, some or all of which may also be nucleated.

DETAILED DESCRIPTION OF THE PREFERRED EMBODIMENTS

Nucleating agents are well known additives to polyolefins, particularly with respect to polypropylene and linear low density polyethylene, and have traditionally been added to injection- and blow-molding resins (although more recently nucleating agents have been used or suggested for use in film and sheet) for decreased molding shrinkage, greater gloss and/or reduced haze. Effects on other properties have sometimes been noted as well, including improved stiffness or higher flexural and tensile moduli. While the manner in which nucleants improve the clarity of a polyolefin is generally agreed upon, the manner in which flexural and tensile moduli and other physical properties are affected is not clearly understood.

Applicant has discovered that the addition of one or more nucleating agents of polyolefins to a facestock material of one or more homopolymers of olefins or of one or more copolymers of olefins or of a mixture of these homopolymer and copolymer materials can improve the dispensability of the facestock, but more particularly improves the clarity and die-cuttability of the facestock. The improved dispensability is reflected in the examples below in a higher 1 percent secant modulus, while improved die-cuttability is seen in reduced ultimate tensile strengths and/or significantly reduced Elmendorf tear values.

In a preferred embodiment, the pressure-sensitive labelstock of the present invention comprises a release-coated liner, an unpigmented facestock of the type described in the preceding paragraph, and a pressure-sensitive adhesive which releasably joins the facestock to the release-coated liner. Any conventional liner previously employed with the known vinyl, low density or medium density facestocks may be suitably employed in the present invention, and the pressure-sensitive adhesive may similarly be of a conventional nature for the intended use of the labelstock of the present invention.

In one embodiment of the film facestock, the film facestock is of a single blended layer which consists essentially of one or more nucleating agents of polyolefins and (a) one or more homopolymers of olefins or (b) one or more copolymers of olefins or (c) a mixture of (a) and (b). It is expected that this single layer embodiment will have particular utility where a glossy label is acceptable or desirable (since nucleating agents as mentioned above increase gloss), and further where the container to be labeled does not hold materials which may be subject to regulation by the Food & Drug Administration.

A preferred single-layer embodiment of the film facestock consists essentially of the one or more nucleating agents and a low density polyethylene, a medium density polyethylene, a high density polyethylene, or a combination of such polyethylenes.

"Low density polyethylene" as used herein refers to the conventionally-known branched low density ethylene homopolymers having a density of from about 0.910 to about 0.925 grams per cubic centimeter at 25 deg. C., while "medium density polyethylene" and "high density polyethylene" refer to the linear ethylene homopolymers having densities in the ranges of from about 0.925 up to about 0.940 grams per cubic centimeter and 0.940 grams per cubic centimeter and greater, respectively.

The nucleating agents expected to be useful in the present invention include any of the materials which function as a nucleating agent in a polyolefin to raise its crystallization temperature and accelerate crystallization.

There are a significant number of known nucleating agents for polyolefins, see, e.g., U.S. Pat. No. 4,801,637 to McCullough and the references cited therein at col. 2, lines 10-35, but these can be divided basically into non-meltable nucleating agents and meltable nucleating agents. "Meltable" nucleating agents are those organic nucleating materials which possess melting points below the processing temperature of the particular polyolefin to be nucleated, and which can therefore be easily and evenly dispersed in the polyolefin. It is this latter type of organic nucleating agent that is preferred for purposes of the present invention. Examples of suitable meltable nucleating agents include dibenzylidene sorbitol (DBS), methyl dibenzylidene sorbitol, potassium stearate, and sodium bis-(para-t-butylphenol) phosphate.

More preferably, the film facestock in this first, generally preferred single layer embodiment is from about 0.5 to about 5.0 mils thick and consists essentially of dibenzylidene sorbitol as the nucleating agent and a blend of two or all three of low, medium and high density polyethylene. A facestock consisting essentially of dibenzylidene sorbitol and a blend of high and low density polyethylenes is especially preferred. While the use of a single grade of polyethylene would likely be simpler from a manufacturing perspective and perhaps provide better optical qualities, in most circumstances it is expected that the design flexibility afforded by using a blend of grades will be a more important consideration.

In this particularly preferred embodiment of the single-layer version of the facestock, the dibenzylidene sorbitol (DBS) can be from about 0.05 up to about 0.75 percent by weight of the facestock for high density-rich and low density-rich polyethylene blends, respectively. Preferably the DBS is from about 0.25 to about 0.50 percent by weight of the facestock, with the high and low density materials being from about 10 to about 70 percent by weight and from about 90 to about 30 percent by weight, respectively, of the facestock and with 0 to about 4.5 percent of a carrier for dibenzylidene sorbitol.

More preferably the facestock is from about 0.15 to about 0.4 percent by weight of DBS, from about 25 to about 50 percent by weight of low density polyethylene, from about 75 to about 50 percent by weight of high density polyethylene, and from 0 to about 3.6 percent by weight of a carrier for dibenzylidene sorbitol.

The single layer version of the facestock is conventionally made by combining the meltable nucleating agent or agents and the particular polyethylene(s) selected in the melt phase in an extruder, and then either employing a cast or blown film process to produce the film facestock. Preferably, however, the facestock is made by a cast film process.

The dibenzylidene sorbitol nucleating agent may, as suggested above, be conveniently employed in the form of a concentrate of DBS in the carrier material. Examples of suitable concentrates include those sold by Milliken Chemical Co. as Millad* 5C41-10 brand DBS concentrate (10 percent by weight of dibenzylidene sorbitol, CAS#32647-67-9, in 90 percent by weight of a random ethylene/polypropylene copolymer) or Millad* 5L71-10 brand DBS concentrate (10 percent by weight of the same dibenzylidene sorbitol in 90 percent by weight of low density polyethylene).

The facestock employed in the present invention may also be comprised in other embodiments of a plurality of layers, as for example in one plural-layer embodiment including a layer consisting essentially of one or more nucleating agents of polyolefins and a low density polyethylene, a medium density polyethylene, a high density polyethylene or a blend of two or all three of these materials.

In a preferred embodiment of this plural-layer version of the facestock of the present invention, the facestock comprises a nucleated polyethylene or polyethylene blend layer and at least one skin layer which forms an outer face of the facestock relative to the liner material and to a container to which a label prepared from the facestock is to be applied. Preferably at least the layer closest to the liner material is nucleated for reducing the overall tear strength of the facestock and for thus improving the die-cuttability of the facestock, although more generally all of the layers except for the outer skin layer can be nucleated, for example to reduce the haze of the facestock as well as to reduce its tear strength.

It is expected that a plural layer embodiment of the facestock as described in the preceding paragraph (i.e., wherein at least the layer closest the liner is nucleated, and perhaps all of the layers save the outer skin layer are also nucleated) will normally be preferred over a single layer embodiment or a plural layer embodiment including a nucleated outer skin layer where the container to be labeled contains materials which may be subject to regulation by the Food & Drug Administration or where a matte finish is desired at the outer face of the facestock.

As a more general matter, a plural-layer version of the facestock may be preferred over a single layer version for added design flexibility, for permitting recycled material to be isolated in the core layer, or for providing consistent printing or other surface performance characteristics while enabling a variety of changes in the composition, number or order of other layers.

In a particularly preferred version of the plural-layer facestock the facestock has a non-nucleated outer skin layer and a nucleated core layer. The core layer consists essentially of a combination of DBS and high and low density polyethylenes and is from about 50 to about 95 percent of the facestock's overall about 0.5 mil to about 5 mil thickness. The dibenzylidene sorbitol (DBS) can again be from about 0.05 up to about 0.75 percent by weight of the core layer depending on the preponderance in the core layer of either of the high or low density materials.

More preferably the core layer of the facestock forms about 70 to about 95 percent of the facestock's overall thickness and is composed of from about 0.25 to about 0.5 percent by weight of DBS, from about 10 to about 70 percent by weight of low density polyethylene, from about 90 to about 30 percent by weight of high density polyethylene, and from 0 to about 4.5 percent by weight of a carrier for dibenzylidene sorbitol.

Most preferably the core layer of the preferred embodiment of the plural-layer facestock is about 80 to about 90 percent of the facestock's thickness and is composed of from about 0.15 to about 0.40 percent by weight of DBS, from about 25 to about 50 percent by weight of low density polyethylene from about 75 to about 50 percent by weight of high density polyethylene, and from 0 to about 3.6 percent by weight of a carrier for dibenzylidene sorbitol.

The skin layer at the outer face of the facestock in each of these embodiments is desirably low density polyethylene.

The various plural-layer embodiments of the facestock may be made by laminating or adhering separately-formed layers, but preferably are made by coextrusion of the materials for the various layers, and most preferably by a cast coextrusion process.

The labelstock of the present invention is conventionally manufactured by coating a facestock of a type described in detail above with a pressure-sensitive adhesive, and then applying a release-coated liner to the pressure-sensitive adhesive of the coated facestock. These steps are well known to those skilled in the label art, and require no further elaboration. Labels are similarly conventionally prepared from the labelstock by printing on the facestock, die-cutting the printed facestock into labels, and stripping the surrounding matrix away from the liner to leave a plurality of spaced-apart, printed labels releasably joined to a liner. These labels are ultimately dispensed onto containers or other substrates from the liner and applied to such containers or substrates, again according to known labeling practices. Alternately, the film facestock may be reverse-printed prior to coating, then lined, die-cut and matrix-stripped.

Those skilled in the art will appreciate that while preferred embodiments of the facestock have been described herein which employ various ratios of the polyethylenes and various combinations of nucleated and non-nucleated layers and layer thicknesses, it will be possible to construct suitably dispensable and die-cuttable, contact clear facestocks from other olefin homopolymers and copolymers of olefins given a knowledge of what contact clear facestock materials have been acceptable in these properties previously (i.e., frosty vinyl), the guidance provided above, and the illustrative examples which follow:

EXAMPLES 1–3

Blown, monolayer films were prepared in three nucleated MDPE compositions on a research-scale blown film line at an average film thickness of 3.5 mils. The Elmendorf tear and 1 percent secant modulus properties (per ASTM D-882) were determined for each film in the machine and transverse directions for comparison to the properties of a non-nucleated MDPE film (also blown) of 3.5 mils average thickness. Percent haze was also determined for each film by ASTM D-1003.

The results of these measurements are indicated below in Table I, where film "A" is the non-nucleated MDPE film (density of 0.930 g/cc at 25 deg. C.), film "B" consists of 97.5 weight percent of the same MDPE with 2.5 weight percent of Millad* 5C41-10 brand DBS concentrate (0.25 weight percent DBS plus 2.25 weight percent random ethylene/polypropylene copolymer), film "C" is 95.0 percent by weight of the MDPE with 5.0 percent by weight of Millad* 5C41-10 brand DBS concentrate (0.5 wt. percent DBS, 4.5 wt. percent random ethylene/propylene copolymer), and film "D" is 92.5 weight percent of the MDPE with 7.5 weight percent Millad* 5C41-10 brand DBS concentrate (0.75 weight percent DBS, 6.75 weight percent random ethylene/propylene copolymer):

TABLE I

| Film | Elmendorf Tear, g/mil (MD/TD) | Percent Haze | 1 Percent Secant Modulus/ksi (MD/TD) |
| --- | --- | --- | --- |
| A | 67/71 | 10.6 | 46/44 |
| B | 38/46 | 5.4 | 54/54 |
| C | 30/46 | 8.0 | 52/54 |

TABLE I-continued

| Film | Elmendorf Tear, g/mil (MD/TD) | Percent Haze | 1 Percent Secant Modulus/ksi (MD/TD) |
| --- | --- | --- | --- |
| D | 32/46 | 10.7 | 54/53 |

The test results reported in Table I show lower Elmendorf tear and higher modulus values for the nucleated films at reduced or equivalent levels of haze, and suggest saturation at a nucleating agent content of about 0.5 percent by weight. The nucleated films also appeared to have a reduced bluish cast compared to the non-nucleated MDPE film.

EXAMPLE 4

Cast, monolayer films were made on a research-scale cast film line from various non-nucleated blends of a low density polyethylene (0.9245 g/cc) and a high density polyethylene (0.962 g/cc), along with one nucleated blend of the same low density and high density polyethylenes (film "E", 24.375 wt. percent LDPE, 73.125 wt. percent HDPE, 0.25 wt. percent DBS, and 2.25 wt. percent random ethylene/propylene copolymer (from Millad* 5C41-10 brand DBS concentrate)). Each of the films was made at an average thickness of 3.5 mils.

Film "A" was 100 wt. percent LDPE, film "B" was 75 wt. percent LDPE and 25 wt. percent HDPE. Film "C" was a blend of 50 wt. percent each of the LDPE and HDPE, while film "D" was 25 wt. percent of LDPE with 75 wt. percent of HDPE. Film "E" was nucleated, and was composed as indicated in the preceding paragraph. Film "F", like film "D", was 25 wt. percent LDPE and 75 wt. percent HDPE but was made via a process employing a different cast roll temperature than film "D". Film "G" was like films "D" and "F" in composition, but was prepared at another cast roll temperature than employed for films "D" and "F".

These films "A" through "G" were each tested for percent haze per ASTM D-1003, and for machine direction and transverse direction 1 percent secant modulus per ASTM D-882.

The results of these tests are shown below Table II:

TABLE II

| Film | Cast Roll Temp. in deg. F. | Percent Haze | 1 Percent Secant Modulus in ksi (MD/TD) |
| --- | --- | --- | --- |
| A | 150 | 6.3 | 23/22 |
| B | 150 | 10.8 | 33/34 |
| C | 150 | 15.6 | 52/55 |
| D | 150 | 16.5 | 68/70 |
| E | 150 | 11.6 | 76/73 |
| F | 125 | 14.1 | 64/64 |
| G | 175 | 19.5 | 78/83 |

The data in Table II show the nucleated films as possessing lower levels of haze at comparable moduli, or as enabling higher moduli and increased stiffness and dispensability without increased levels of haze.

EXAMPLES 5–7

Cast, monolayer films of a given composition were prepared for these examples on a research-scale cast line at various cast roll temperatures, with a non-nucleated composition and a nucleated composition being employed for comparing the effect of cast roll temperature changes on nucleated and non-nucleated facestocks of the present invention. All of the films were prepared at an average thickness of 3.5 mils.

Film composition "A" in Table III below was a non-nucleated blend of 90 percent by weight of a high density polyethylene (0.962 g/cc) and 10 percent by weight of a low density polyethylene (0.9245 g/cc). Film composition "B" was a nucleated composition of 90 percent by weight of the same HDPE, 7.5 weight percent of the same LDPE, 0.25 weight percent of DBS, and 2.25 weight percent of a LDPE carrier having a density of 0.920 grams per cubic centimeter at 25 deg. C.

Each of the films prepared in the manner described was tested for percent haze according to ASTM D-1003, for 60 degree gloss according to ASTM D-2457, and for 2 percent secant modulus (machine direction (MD) only) according to ASTM D-882. The results of these various tests are found in Table III as follows:

TABLE III

| Film Composition | Cast Roll Temp. in Deg. F. | Percent Haze | 60 Degree Gloss | 2 Percent Secant Modulus, in ksi (MD) |
| --- | --- | --- | --- | --- |
| A | 195 | 40.3 | 77.0 | 74.4 |
|   | 175 | 37.4 | 79.6 | 70.4 |
|   | 155 | 27.9 | 89.5 | 66.1 |
| B | 195 | 17.0 | 101.2 | 83.0 |
|   | 175 | 15.0 | 96.8 | 78.2 |
|   | 155 | 16.0 | 97.7 | 72.5 |

The results reported in Table III show the nucleated film to possess reduced haze, increased gloss and increased modulus compared to a non-nucleated film prepared at the same cast roll temperature.

EXAMPLE 8

For this example, 3.5 mil-thick single-layer cast films were prepared on a research-scale cast film line from a nucleated blend of a low density polyethylene and polypropylene (Film A in Table IV below), and from a non-nucleated blend of the same low density polyethylene and polypropylene (Film B in Table IV below). Film B was comprised of 60 percent by weight of Dow Chemical's LDPE 6811 grade low density polyethylene (density of 0,922 grams per cubic centimeter) and 40 percent by weight of Exxon's Escorene* 4193 grade polypropylene (density of 0.900 g/cc). Film A was comprised of 57.5 percent by weight of LDPE, 40 percent by weight of PP, and 2.5 weight percent of Millad* 5L71-10 brand DBS concentrate (10 percent by weight of dibenzylidene sorbitol in 90 percent by weight of low density polyethylene).

Films A and B were each tested for 1 percent secant modulus (per ASTM D-882), ultimate tensile strength (ASTM D-882), ultimate elongation (ASTM D-882), haze (ASTM D-1003) and 60 degree gloss (ASTM D-2457) properties, with the results reported in Table IV below.

TABLE IV

| Film | 1% Secant Modulus, ksi (MD/TD) | Ultimate Tensile, ksi (MD/TD) | Ultimate Elongation, Pct. (MD/TD) | Haze, Pct | 60 Degree Gloss (side 1/side 2) |
| --- | --- | --- | --- | --- | --- |
| A | 61.2/58.3 | 4.67/3.43 | 480/520 | 32.6 | (49/63) (MD) |
|   |           |           |         |      | (26/29) (TD) |
| B | 64.7/59.5 | 5.04/3.85 | 580/660 | 48.8 | (29/41) (MD) |

TABLE IV-continued

| Film | 1% Secant Modulus, ksi (MD/TD) | Ultimate Tensile, ksi (MD/TD) | Ultimate Elongation, Pct. (MD/TD) | Haze, Pct | 60 Degree Gloss (side 1/side 2) |
| --- | --- | --- | --- | --- | --- |
|   |   |   |   |   | (22/33) (TD) |

Films A and B were comparable in stiffness, but the nucleated film A possessed lower haze, higher gloss, reduced ultimate elongation and reduced ultimate tensile strength compared to the non-nucleated film B.

EXAMPLE 9

For this example a non-nucleated, single-layer cast film (film "A" below), having an average thickness of 3.5 mils, was prepared from Himont's Profax 8523 brand ethylene/propylene block copolymer (20–85 percent of ethylene). A second, nucleated version of the film (film "B") was prepared for comparison with 5 percent by weight of Millad* 5C41-10 brand DBS concentrate. Both films were tested according to ASTM D-882 for 1 percent secant modulus, yield and ultimate tensile strengths, and ultimate elongation, with the results reported below in Table V.

TABLE V

| Film | 1 Pct. Secant Modulus, in ksi (MD) | Yield Tensile, in ksi (MD) | Ultimate Tensile, in ksi (MD) | Ultimate Elongation, in Percent (MD) |
| --- | --- | --- | --- | --- |
| A | 78.3 | 2.96 | 3.7 | 1180 |
| B | 92.8 | 2.99 | 2.4 | 300 |

The test data in Table V suggests that nucleation in Film "B" increased the stiffness and dispensability of the facestock while decreasing significantly the resistance of the facestock to die-cutting, as indicated by ultimate tensile strength and ultimate elongation measurements.

Those skilled in the art will appreciate that while numerous embodiments of the facestock and labelstock of the present invention have been described and exemplified herein, a number of other embodiments may be made employing the teachings and guidance offered herein which nevertheless are properly within the scope and spirit of the present invention, as more particularly defined in the claims below. For example, while the preferred embodiments of the labelstock employ facestocks which are unpigmented for purposes of achieving a "no-label" look when adhered to containers, certain benefits of a nucleated polyethylenic facestock (i.e., in terms of improved dispensability and particularly in terms of improved die-cuttability) may be as fully realized in the pigmented or paper-like facestocks.

What is claimed is:

1. A pressure-sensitive labelstock which comprises:

a release-coated liner;

a dimensionally stable facestock including a layer consisting essentially of from about 0.05 to about 0.75 percent by weight of the facestock of dibenzylidene sorbitol and from about 10 to about 70 percent by weight of low density polyethylene, from about 90 to about 30 percent by weight of high density polyethylene, and from about 0 to about 4.5 percent by weight of carrier material for dibenzylidene sorbitol; and a pressure-sensitive adhesive for releasably joining the facestock to the release-coated liner, wherein the nucleated facestock has improved dispensability, clarity and die-cuttability compared to a non-nucleated facestock.

2. A labelstock as defined in claim 1, wherein the facestock is from about 0.5 to about 5.0 mils thick.

3. A labelstock as defined in claim 1, wherein the facestock consists of a plurality of layers.

4. A labelstock as defined in claim 3, wherein the facestock comprises a core layer and at least one skin layer, which skin layer forms an outer face of the facestock relative to the liner material and to a container to which a label prepared from the facestock is to be applied.

5. A labelstock as defined in claim 4, wherein at least the skin layer forming the outer face of the facestock is not nucleated.

6. A labelstock as defined in claim 4, wherein at least the layer of the facestock nearest the liner material and to a container to which a label prepared from the facestock is to be applied is nucleated.

7. A labelstock as defined in claim 4, wherein the facestock has an overall thickness of from about 0.5 to about 5.0 mils, and wherein the core layer of the facestock consists essentially of a combination of dibenzylidene sorbitol and high and low density polyethylenes and is from about 50 to about 95 percent of the facestock's overall thickness, with the dibenzylidene sorbitol being from about 0.05 to about 0.75 percent by weight of the facestock.

8. A label made from the labelstock of claim 1.

9. A substrate labeled with a label as defined in claim 8.

10. A labeled substrate as defined in claim 9, wherein the substrate is squeezable.

11. A pressure-sensitive labelstock which comprises:

a release-coated liner;

a dimensionally stable facestock including a single blended layer consisting essentially of from about 0.25 to about 0.50 percent by weight of a dibenzylidene sorbitol nucleating agent, from about 10 to about 70 percent by weight of low density polyethylene, from about 90 to about 30 percent by weight of high density polyethylene, and from 0 to about 4.5 percent by weight of a carrier material for the dibenzylidene sorbitol, said facestock being from about 0.5 to about 5.0 mils thick; and a pressure-sensitive adhesive for releasably joining the facestock to the release-coated liner, wherein the nucleated facestock has improved dispensability, clarity and die-cuttability compared to a non-nucleated facestock.

12. A pressure-sensitive labelstock which comprises:

a release-coated liner;

a dimensionally stable facestock including a single blended layer consisting essentially of from about 0.15 to about 0.4 percent by weight of a dibenzylidene sorbitol nucleating agent, from about 25 to about 50 percent by weight of low density polyethylene, from about 50 to about 75 percent by weight of high density polyethylene, and from 0 to about 3.6 percent by weight of a carrier material for the dibenzylidene sorbitol, said facestock being from about 0.5 to about 5.0 mils thick; and a pressure-sensitive adhesive for releasably joining the facestock to the release-coated liner, wherein the nucleated facestock has improved dispensability, clarity and die-cuttability compared to a non-nucleated facestock.

13. A labelstock as defined in claim 11 or claim 12, wherein the carrier material is a random copolymer of ethylene and polypropylene.

14. A pressure-sensitive labelstock which comprises:

a release-coated liner;

a dimensionally stable facestock having an overall thickness of from about 0.5 to about 5.0 mils and comprising a core layer and at least one skin layer, wherein one skin layer is low density polyethylene and forms an outer face of the facestock relative to the liner material and to a container to which a label prepared from the facestock is to be applied, and wherein the core layer consists essentially of a combination of dibenzylidene sorbitol and high and low density polyethylenes and is from about 50 to about 95 percent of the facestock's overall thickness, with the dibenzylidene sorbitol being from about 0.05 to about 0.75 percent by weight of the facestock; and a pressure-sensitive adhesive for releasably joining the facestock to the release-coated liner, wherein the nucleated facestock has improved dispensability, clarity and die-cuttability compared to a non-nucleated facestock.

15. A pressure-sensitive labelstock which comprises:

a release-coated liner;

a dimensionally stable facestock comprising a core layer and at least one skin layer, the skin layer forming an outer face of the facestock relative to the liner material and to a container to which a label prepared from the facestock is to be applied, wherein the core layer forms about 70 to about 95 percent of the facestock's overall thickness and is from about 0.25 to about 0.50 percent by weight of dibenzylidene sorbitol, from about 10 to about 70 percent by weight of low density polyethylene, from about 90 to about 30 percent by weight of high density polyethylene, and from 0 to about 4.5 percent by weight of a carrier for dibenzylidene sorbitol; and a pressure-sensitive adhesive for releasably joining the facestock to the release-coated liner, wherein the nucleated facestock has improved dispensability, clarity and die-cuttability compared to a non-nucleated facestock.

16. A pressure-sensitive labelstock which comprises:

a release-coated liner;

a dimensionally stable facestock comprising a core layer and at least one skin layer, the skin layer forming an outer face of the facestock relative to the liner material and to a container to which a label prepared from the facestock is to be applied, wherein the core layer forms about 80 to about 90 percent of the facestock's overall thickness and consists of from about 0.15 to about 0.40 percent by weight of dibenzylidene sorbitol, from about 25 to about 50 percent by weight of low density polyethylene, from about 75 to about 50 percent by weight of high density polyethylene, and from 0 to about 3.6 percent by weight of a carrier for dibenzylidene sorbitol; and a pressure-sensitive adhesive for releasably joining the facestock to the release-coated liner, wherein the nucleated facestock has improved dispensability, clarity and die-cuttability compared to a non-nucleated facestock.

17. A labelstock as defined in claim 15 or claim 16, wherein the skin layer at the outer face of the facestock is low density polyethylene.

* * * * *